Jan. 12, 1954

H. E. VARBLE 2,665,596

SHIFTLESS TRANSMISSION

Filed July 13, 1951

INVENTOR
Harold E. Varble,

BY Mason & Mason

ATTORNEYS.

Jan. 12, 1954 H. E. VARBLE 2,665,596
SHIFTLESS TRANSMISSION
Filed July 13, 1951 2 Sheets-Sheet 2

INVENTOR
Harold E. Varble,
BY Mason & Mason
ATTORNEYS

Patented Jan. 12, 1954

2,665,596

UNITED STATES PATENT OFFICE 2,665,596

SHIFTLESS TRANSMISSION

Harold E. Varble, Avenal, Calif.

Application July 13, 1951, Serial No. 236,523

9 Claims. (Cl. 74—756)

This invention relates to a transmission for automotive vehicles, boats, locomotives and for all uses where it is desired to provide a varying ratio from a source of power to a driven member, that is, for such uses where power is transmitted from an engine to a driven shaft at a speed which may be varied with that of the engine.

The primary object of this invention is to provide a simple assembly of gears assembled as a unit in which no gear is ever shifted from its assembled position, and from which can be obtained any successive gear ratio, from reverse to over-drive, by the movement forward or backward of a single control lever under the hand of the operator.

An additional object of the invention is to provide a gear transmission for connecting the drive shaft to the driven shaft through varying gear ratios from over-drive to neutral and reverse without a clutch and the necessity of shifting gears.

Another object is to provide a transmission having means for varying gear ratios while maintaining the gears in mesh at all times, said transmission providing a novel braking means.

An additional object is to provide a highly flexible transmission provided with means for varying the gear ratio between the drive shaft and the driven shaft without unmeshing the meshed gears of said transmission.

Other objects will appear hereinafter throughout the specification.

Figure 1:
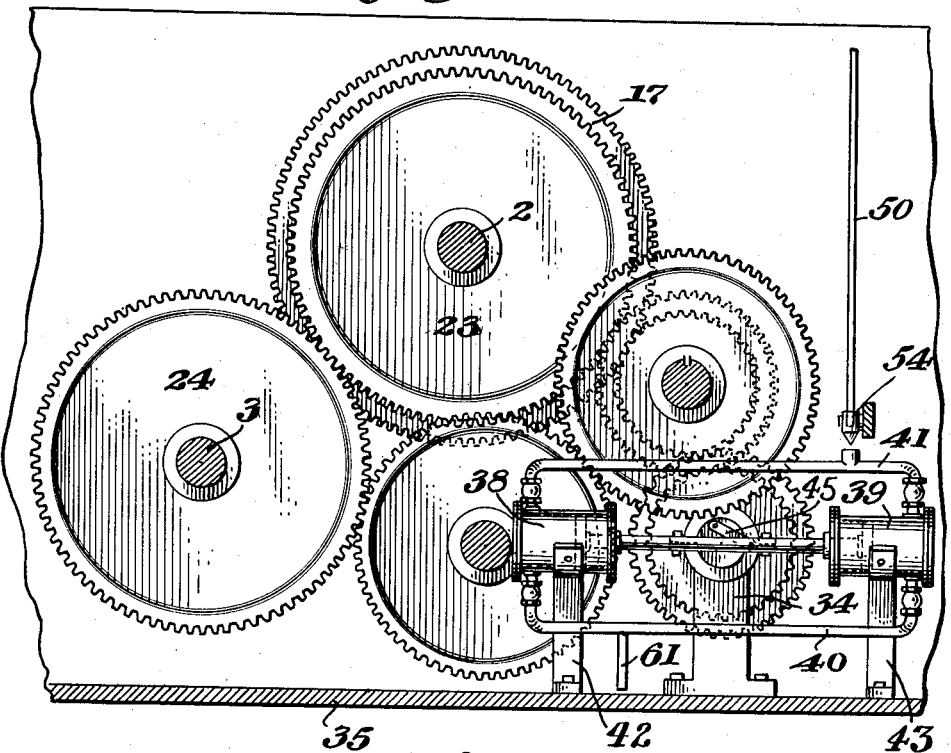
Figure 1 is a side elevation of the transmission, partly in section.

This transmission is made up of three differentials mounted on parallel shafts and engaged in series, the first with the second, the second with the third by the enmeshment of gears. This engagement is permanent and no gear is ever shifted. These three differentials are somewhat different in construction and each serves a different purpose.

The invention relates generally to a gear transmission having a drive shaft connected to the source of power, an intermediate shaft, and a driven shaft. Preferably, each of these shafts has mounted thereon a differential means connected with gearing. This gearing is constantly in mesh as there is no shifting of any gear out of engagement with another gear. This transmission further includes gears mounted on each of the aforesaid shafts comprising one train of gears which is constantly driven as long as the engine or other source of power is running. The other train of gears may be controlled so that one or more of the gears is driven in one or the opposite direction or certain of the gears of this second train may be stopped, all at the will of the operator. The invention, however, does not preclude the use of one or more clutches, although it is preferred to dispense with the use of clutches.

Referring to the drawings, the numeral 1 is the drive shaft which is preferably directly connected to the engine or other source of power. The invention does not preclude, however, the use of a clutch between the source of power and the shaft 1. A clutch may be used at any suitable place in the transmission. However, as stated above, the preferred construction omits a clutch or any means for disengaging the gears hereinafter to be described.

The numeral 2 indicates the intermediate shaft, and 3 is the driven shaft which latter may be connected to drive wheels or any other driven mechanism, such as a track laying tractor, a ship's propeller, or any machine.

The primary gear train comprises a side drive gear 5 keyed to the drive shaft 1 by the key 4. This gear drives the intermediate side gear 6 which freely turns on the shaft 2. Gear 6 meshes with the driven side gear 7 freely mounted on the driven shaft 3. This primary gear train is constantly driven as long as the engine is running, but as stated above, a clutch may be interposed between the engine and the drive shaft 1 so that this train of gearing would only be driven when the clutch is engaged.

Shafts 1, 2 and 3 each mount differentials 8, 9 and 10 respectively. Driving side gears of differential 8 are indicated by the numerals 11 and 12. These gears are freely rotatable on shaft 1. Gear 11 is provided with beveled gear 13 and gear 12 is provided with beveled gear 14. These gears mesh with the pinion or spider gears 15 and 16 forming part of differential 8. The pinion gears 15, 16 are mounted on short carrier shafts that are fixed to rotate with the drive shaft 1. It will be noted that the side driving gears 11 and 12 are of different size. These gears mesh with side driven gears 17 and 18 respectively, which gears are of different size and which are freely mounted on the intermediate shaft 2. It will be noted that the intermediate differential is mounted between and connects these gears to each other. The intermediate differential consists of a collar 9 fixed to gear 18, and this collar has a bevel gear 19 fixed thereto. Gear 17 carries the spider gears 20 and 21, and gear 23 has a bevel gear, not shown. All three gears 17, 18 and 23 are loose on shaft 2, and the bevel gears of collar 9 and gear 23 are connected by the spider gears 20 and 21 on the gear 17.

Figure 3:
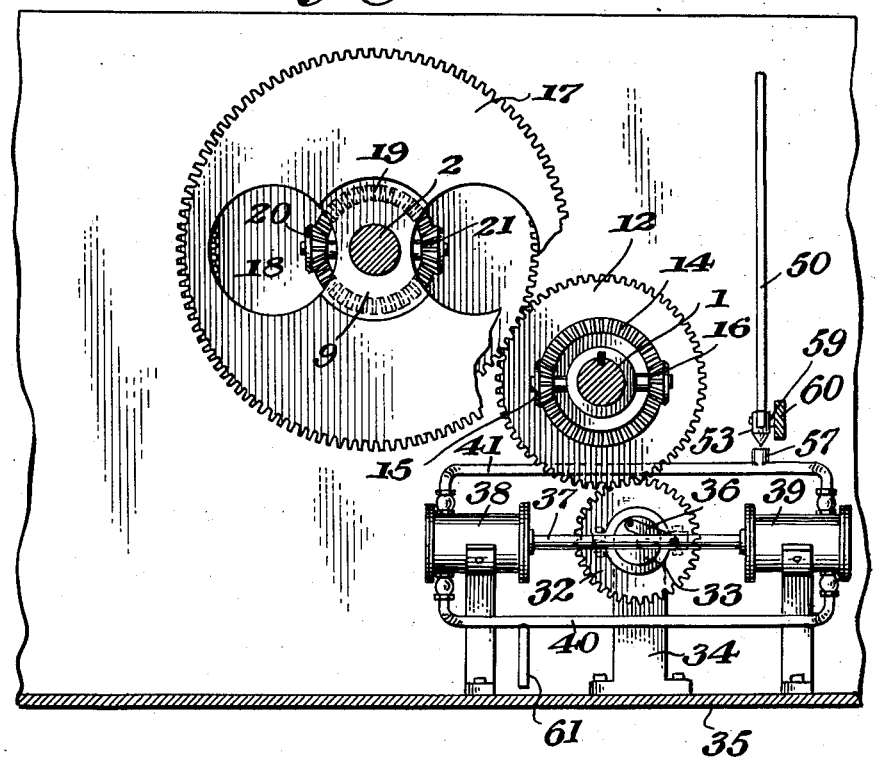
Figure 3 is a vertical sectional view taken on the line 3—3 of Figure 2.

Mounted for free rotation about the intermediate shaft 2 are the pinion or spider gears 20 and 21 as seen in Figure 3. Mounted on this shaft 2 and also freely rotatable thereon is the intermediate gear 23. This gear is in mesh with side driven gear 24 which, like gear 7, is free on the shaft 3.

Gears 7 and 24 are each provided with beveled gears 25 and 26 respectively, each being fixed to its respective side driven gears and forming part of the driven differential 10. Also forming part of this differential are pinion or spider gears 28 and 29. These latter gears are mounted on a carrier that rotates with the shaft 3. Differential 8 is keyed to shaft 1 by key 30, and differential 10 is keyed to shaft 3 by key 31.

The control mechanism illustrated consists of a pair of pumps and a fluid circuit for each gear 11 and 12 with means for controlling the flow of fluid in the fluid circuit in which each pair of pumps is located.

Referring to Figure 3, gear 12 is in meshed relationship with gear 32 freely mounted on shaft 33 having suitable supporting pedestals 34 which are bolted to the gear case 35 or any other suitable support. A link 36 pivotally connects the pump gear 32 with the reciprocating shaft 37 having pistons, not shown, in cylinders 38 and 39. These cylinders are connected to each other by conduits 40 and 41 so as to form a fluid circuit, and the cylinders are supported on pedestals 42 and 43.

Figure 2:
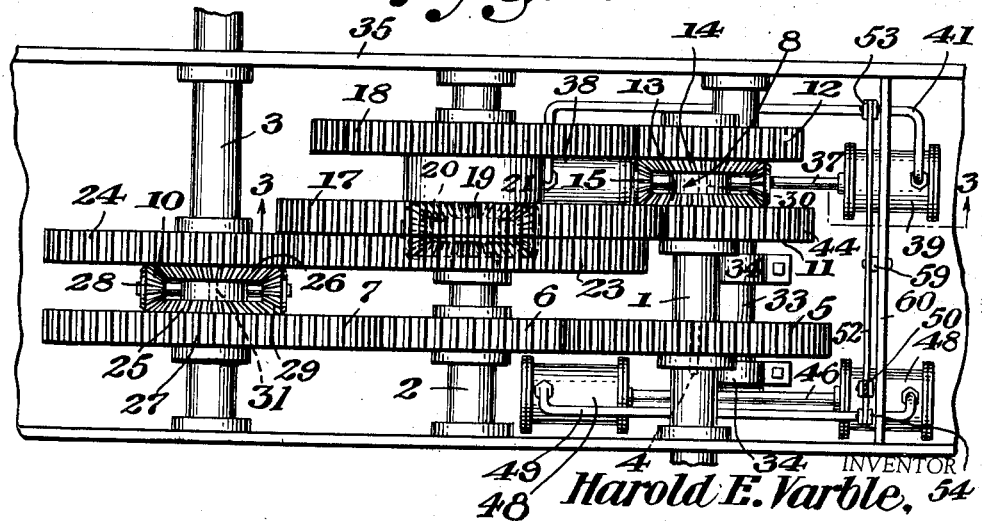
Figure 2 is a top plan view.

The rotation of the gear 11 is controlled by similar mechanism to that described above. This consists of a gear 44 also mounted for free rotation on shaft 33 having a link 45 similar to link 36. Link 45 pivotally connects reciprocating shaft 46 which operates pistons, not shown, in cylinders 47 and 48 which latter are connected to each other by conduits similar to conduits 41 and 42. Only one of these conduits 49 is shown in Figure 2.

The control of rotary movement of the gears 11 and 12 is determined by the flow of fluid in the circuit of each pair of pumps. As diagrammatically illustrated in Figure 4, this may be controlled by a control rod 50 which extends to within easy reach of the operator. Should the present mechanism form part of the automobile or truck drive the rod 50 would extend by linkage to a point adjacent the steering wheel. The opposite end of the rod 50 is provided with a pivot 51 so as to pivotally connect the same to a link 52, the opposite ends of which are provided with plungers or pistons 53 and 54 that are connected to the link 52 by pivots 55 and 56. In actual practice these pistons will extend down into and form a fluid tight engagement with the walls of cylinders 57 and 58 which form extensions of the pipes 41 and 49 respectively. For illustrative purposes, the pistons have been shown as located above the cylinders 57 and 58. Link 52 is pivotally connected at 59 to a suitable stationary support 60 forming one of the sides of the gear case.

These pump systems may act as brakes or as the means for causing driven shaft 3 to rotate in either direction or to remain stationary, even though shaft 1 is constantly driven.

Figure 4:
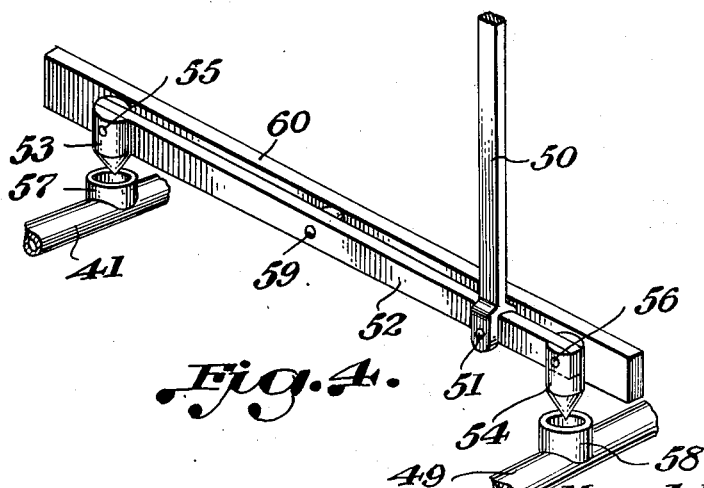
Figure 4 is an enlarged perspective view of the control mechanism.

Since gears 11 and 12 are mounted freely on the shaft 1 but are in mesh with spider gears 15 and 16 which latter are driven by the engine shaft, if either gear 11 or 12 is held stationary, the power of the engine is sent through the other gear. Each side gear 11 or 12 is provided with the braking system indicated above. With this system which is illustrated in Figure 4, either gear 11 or 12 can be alternately slowed down or stopped in its rotation. Should it be desired to stop the rotation of gear 12, the lever 50 is actuated by moving the same upward as seen in Figure 1. This action will cause the piston 53 to stop the flow of fluid through conduit 41 halting the movement of fluid in the circuit which includes cylinders 38 and 39 by causing the differential on drive shaft 1 to drive gear 11, gear 17 and through differential 9, gear 23, gear 24 and through the driven differential, driven shaft 3. This is the position for over-drive of the driven shaft 3.

Should the control rod 50 be pushed downwardly far enough, piston 54 would stop the flow of fluid in pipe 49 thus stopping the rotation of gear 11 and permitting through the driving differential, the driving of gears 12, 18, 23 and 24, thus reversing the drive of shaft 3, that is, causing this shaft to rotate in the opposite direction.

The pairs of pumps are connected so as to pick up oil from the sump of the gear case as shown, or the oil may be in a closed circuit for each of the pumps.

In place of the pistons and cylinders shown in Figure 4 any suitable valve arrangement with linkage to the valves may be substituted. The arrangement of pumps and the control shown form no part of the present invention except my invention broadly includes any control means for slowing down or stopping the rotation of either gear 11 or 12.

Through the differential construction shown in Figures 2 and 3 and assuming drive shaft 1 is continuously rotating during the operation of the engine or other power source, the driven shaft 3 may be rotated from a position of over-drive to its extreme position where the shaft 3 will rotate opposite its rotation when in over-drive position. Moreover, the gears and differentials insure that the driven shaft 3 can be driven from its over-drive position to any intermediate R. P. M. until the shaft 3 is in a neutral or non-rotating position by manipulation of the lever 50.

Moreover, this lever may be used to cause the pumps to act as brakes in the shaft 3 in either direction.

While a preferred specific embodiment of the invention has been hereinbefore set forth, it is to be clearly understood that the invention is not to be limited to the apparatus shown, because various modifications of the construction shown may be resorted to in putting the invention into practice, all within the purview of the appended claims. The drawings and specification are therefore to be understood as illustrative rather than limiting.

I claim:

1. Power transmission mechanism comprising a drive shaft, an intermediate shaft and a driven shaft, a primary gear train composed of a plurality of gears in mesh with each other and including a gear fixedly mounted on said drive shaft and gears freely mounted on each of the said other shafts, whereby all of the gears of said primary gear train are continuously driven by said drive shaft, a secondary gear train composed of a plurality of gears on said drive shaft and on said intermediate shaft and at least one gear on said driven shaft, said secondary gear train including a differential means fixed on said drive shaft drivingly connected to the gears on said shaft of said secondary gear train and also including a second differential means on said intermediate shaft drivingly connected to the gears on said shaft, a third differential means fixed on said driven shaft drivingly connected to the gears on said driven shaft of both said primary and secondary gear trains, means for selectively controlling the gears of the secondary train on said drive shaft whereby either forward or reverse rotation is imparted to said driven shaft.

2. Power transmission mechanism comprising a drive shaft, an intermediate shaft and a driven shaft, a primary gear train composed of a plurality of gears in mesh with each other and including a gear mounted on each of the said shafts, means rigidly connecting said drive shaft with the gear mounted thereon whereby all of the gears of said primary gear train are continuously driven by said drive shaft, a secondary gear train composed of a plurality of gears on said drive shaft and on said intermediate shaft and at least one gear on said driven shaft, said secondary gear train including a differential means fixed on said drive shaft drivingly connected to the gears on said shaft of said secondary gear train and also including a second differential means on said intermediate shaft drivingly connected to the gears on said shaft, and a third differential means fixed on said driven shaft drivingly connected to the gears on said driven shaft of both said primary and secondary gear trains and means for selectively controlling the rotation of the gears of said secondary gear train on said drive shaft.

3. Power transmission mechanism comprising a drive shaft, an intermediate shaft and a driven shaft, a primary gear train composed of a plurality of gears in mesh with each other and including a gear mounted on each of the said shafts, means rigidly connecting said drive shaft with the gear mounted thereon whereby all of the gears of said primary gear train are continuously driven by said drive shaft, a secondary gear train composed of a plurality of gears on said drive shaft and on said intermediate shaft and at least one gear on said driven shaft, said secondary gear train including a differential means on said drive shaft drivingly connected to the gears on said shaft of said secondary gear train and also including a second differential means on said intermediate shaft drivingly connected to the gears on said shaft, and a third differential means on said driven shaft drivingly connected to the gears on said driven shaft of both said primary and secondary gear trains and manually controlled means for selectively controlling the rotational movements of the gears of said secondary gear train.

4. Power transmission mechanism comprising a drive shaft, an intermediate shaft and a driven shaft, a primary gear train composed of a plurality of gears in mesh with each other and including a gear mounted on each of the said shafts, means rigidly connecting said drive shaft with the gear mounted thereon whereby all of the gears of said primary gear train are continuously driven by said drive shaft, a secondary gear train composed of a plurality of gears on said drive shaft and said intermediate shaft and at least one gear on said driven shaft, and secondary gear train including a differential means fixed on said drive shaft drivingly connected to the gears on said shaft of said secondary gear train and also including a second differential means on said intermediate shaft drivingly connected to the gears on said shaft, and a third differential means fixed on said driven shaft drivingly connected to the gears on said driven shaft of both said primary and secondary gear trains and manually controlled means for selectively controlling the rotational movements of the gears of said secondary gear train on said drive shaft.

5. Power transmission mechanism comprising a drive shaft, an intermediate shaft and a driven shaft, a primary gear train composed of a plurality of gears in mesh with each other and including a gear mounted on each of the said shafts, means rigidly connecting said drive shaft with the gear mounted thereon whereby all of the gears of said primary gear train are continuously driven by said drive shaft, a secondary gear train composed of a plurality of gears on said drive shaft and said intermediate shaft and at least one gear on said driven shaft, said secondary gear train including a differential means fixed on said drive shaft drivingly connected to the gears in said shaft of said secondary gear train and also including a second differential means on said intermediate shaft drivingly connected to the gears on said shaft, and a third differential means fixed on said driven shaft drivingly connected to the gears on said driven shaft of both said primary and secondary gear trains and manually controlled hydraulic means for selectively controlling the rotational movements of the gears of said secondary gear train.

6. Power transmission mechanism comprising a drive shaft, an intermediate shaft and a driven shaft, a primary gear train composed of a plurality of gears in mesh with each other and including a gear mounted on each of the said shafts, means rigidly connecting said drive shaft with the gear mounted thereon whereby all of the gears of said primary gear train are continuously driven by said drive shaft, a secondary gear train composed of a plurality of gears on said drive shaft and said intermediate shaft and at least one gear on said driven shaft, said secondary gear train including a differential means fixed on said drive shaft drivingly connected to the gears on said shaft of said secondary gear train and also including a second differential means on said intermediate shaft drivingly connected to the gears on said shaft, and a third differential means fixed on said driven shaft drivingly connected to the gears on said driven shaft of both said primary and secondary gear trains and manually controlled hydraulic means for selectively controlling the rotational movements of the gears of said secondary gear train, said manually controlled hydraulic means including a plurality of pairs of pumps, a fluid circuit for each pair of pumps, means drivingly connecting each pair of pumps to one of said last named gears and manually actuated means for simultaneously controlling the movement of fluid in each of said fluid circuits whereby to control the movement of each pair of pumps and the rotation of the gear to which said pair of pumps is connected.

7. Power transmission mechanism comprising a drive shaft, an intermediate shaft and a driven shaft, a primary gear train composed of a plurality of gears in mesh with each other and including a gear mounted on each of the said shafts, means rigidly connecting said drive shaft with the gear mounted thereon whereby all of the gears of said primary gear train are continuously driven by said drive shaft, a secondary gear train composed of a plurality of gears on said drive shaft and said intermediate shaft and at least one gear on said driven shaft, said secondary gear train including a differential means fixed on said drive shaft drivingly connected to the gears on said shaft of said secondary gear train and also including a second differential means on said intermediate shaft drivingly connected to the gears on said shaft, and a third differential means on said driven shaft drivingly connected to the gears on said driven shaft of both said primary and secondary gear trains and manually controlled hydraulic means for selectively controlling the rotational movements of the gears of said secondary gear train on said drive shaft, said manually controlled hydraulic means including a plurality of pairs of pumps, a fluid circuit for each pair of pumps, means drivingly connecting each pair of pumps to one of said last named gears, and manually actuated means for simultaneously controlling the movement of fluid in each of said fluid circuits whereby to control the movement of each pair of pumps and the rotation of the gear to which said pair of pumps is connected.

8. Power transmission mechanism comprising a drive shaft, an intermediate shaft and a driven shaft, a primary gear train composed of a plurality of gears in mesh with each other and including a gear mounted on each of the said shafts, means rigidly connecting said drive shaft with the gear mounted thereon whereby all of the gears of said primary gear train are continuously driven by said drive shaft, a secondary gear train composed of a plurality of gears on said drive shaft and said intermediate shaft and at least one gear on said driven shaft, said secondary gear train including a differential means fixed on said drive shaft drivingly connected to the gears on said shaft of said secondary gear train and also including a second differential means on said intermediate shaft drivingly connected to the gears on said shaft, and a third differential means fixed on said driven shaft drivingly connected to the gears on said driven shaft of both said primary and secondary gear trains, said plurality of gears on said intermediate shaft of said second gear train including a pair of loose gears on said shaft between which is located said second differential means, a third gear on said intermediate shaft and means connecting said third gear and second differential means directly to each other whereby they rotate as one, said third gear being drivingly connected to the driven gear on said driven shaft of said second gear train.

9. Power transmission means comprising a drive shaft, an intermediate shaft and a driven shaft, a gear fixed to said drive shaft, a gear rotatable on said intermediate shaft, meshing with said first-mentioned gear, a gear rotatably mounted on said driven shaft meshing with the second-mentioned gear, a first differential carrier fixedly mounted on said drive shaft and a second differential carrier fixedly mounted on said driven shaft and a third differential carrier rotatable on said intermediate shaft, said differential carriers each having gears rotatably mounted thereon, a pair of gears on said drive shaft, drivingly connected to the gears of said first differential, a pair of gears on said intermediate shaft drivingly connected to the gears on said third differential and meshing with said first-mentioned pair of gears, a further gear on said driven shaft, said further gear and said third-mentioned gear being drivingly connected to the gear on said second differential and each meshing with one of the gears on said second-mentioned shaft, a fourth shaft, a pair of gears mounted thereon and meshing each with one of the first-mentioned pair of gears, means for selectively braking the gears of said last-mentioned pair whereby forward and reverse rotation is imparted to said driven shaft, through locking of one side or the other of said first differential and causing said further gear to rotate in either of two directions at speeds different from that of said third gear.

HAROLD E. VARBLE.

References Cited in the file of this patent

UNITED STATES PATENTS

| Number | Name | Date |
|---|---|---|
| 1,039,879 | Armstrong | Oct. 1, 1912 |
| 2,201,847 | Cheng | May 21, 1940 |
| 2,348,211 | Frische | May 9, 1944 |

FOREIGN PATENTS

| Number | Country | Date |
|---|---|---|
| 121,880 | Austria | Nov. 15, 1930 |
| 287,595 | Great Britain | Mar. 29, 1928 |
| 40,966 | France | June 14, 1932 |
| | (Addition to No. 718,202) | |